UNITED STATES PATENT OFFICE.

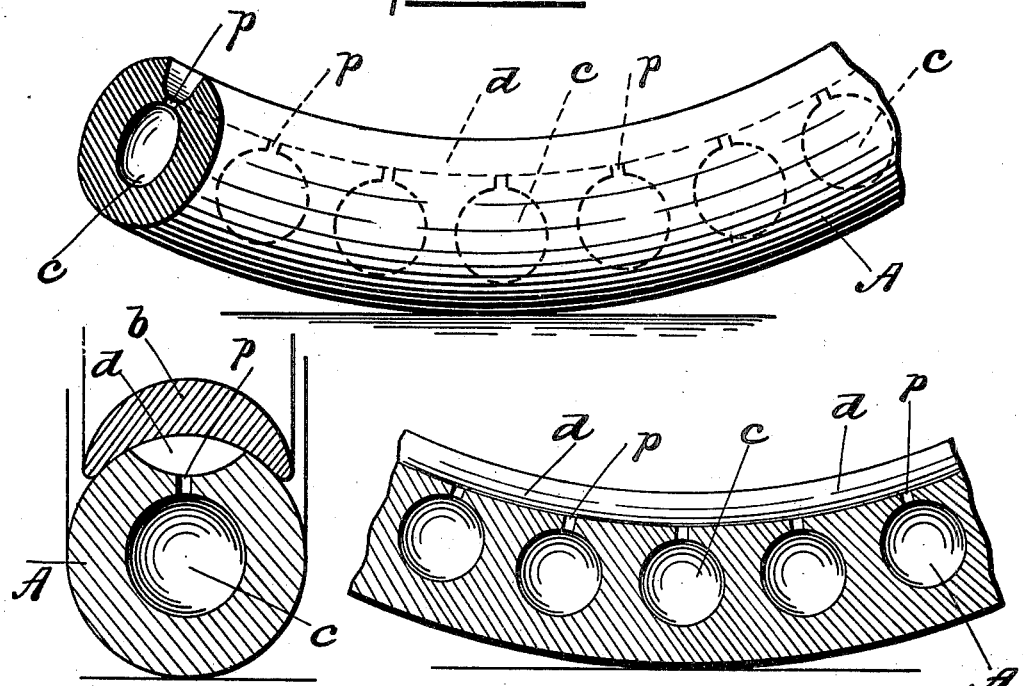
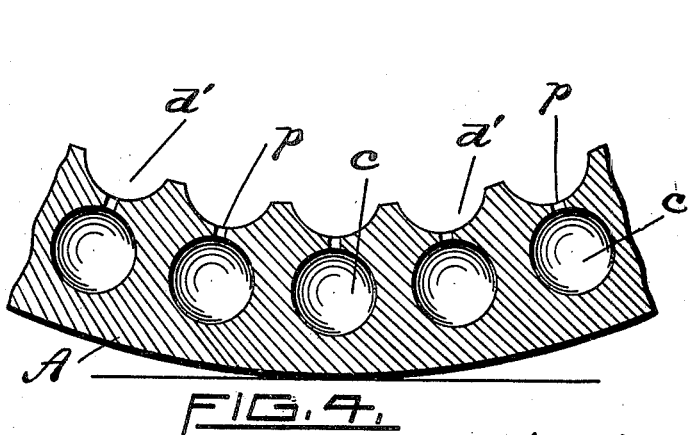

JAMES E. FURLONG, OF PROVIDENCE, RHODE ISLAND.

CUSHION-TIRE.

SPECIFICATION forming part of Letters Patent No. 679,280, dated July 23, 1901.

Application filed November 3, 1900. Serial No. 35,411. (No model.)

*To all whom it may concern:*

Be it known that I, JAMES E. FURLONG, a citizen of the United States, residing at Providence, in the county of Providence and State of Rhode Island, have invented a certain new and useful Cushion-Tire, of which the following is a specification, reference being had therein to the accompanying drawings.

Figure 1 is a section of tire. A is the hard-rubber tire. $c$ is the air-cell. $d$ is the groove. $p$ is the vent. Fig. 2 is a longitudinal section of tire. Fig. 3 is a cross-section of tire. $b$ is a cross-section of the rim of the wheel. Figs. 4 and 5 are the same as Figs. 2 and 3, with the exception that they show numerous grooves crossing the tire instead of one running with it.

Like letters refer to like parts in all the figures or views.

My tire is a hard-rubber tire (marked A in the drawings) containing circular or other shaped air-cells $c$. Each air-cell has a vent $p$ opening into groove in tire $d$ in inner circle of tire, Fig. 1. This groove is made air-tight by being cemented firmly to the rim of the wheel, Fig. 3, thus forming a second air chamber or cell $d$, Fig. 3.

Without departing from the spirit of my invention I wish to claim transverse grooves, as shown in Fig. 4. The number and location of the transverse grooves will correspond with the air-cells in body of tire $d'$. Each air-cell and transverse groove will be connected by vent $p$. I wish to use either of these two forms of grooves. I claim that as the wheel revolves on the ground the pressure of the load will compress some of the air-cells and force some of the air through the vent into the groove, thus compressing the air in the groove. As the wheel continues to revolve the air-cells first pressed will be relieved and will immediately refill themselves with air from the groove, and the other air-cells will be compressed in their turn.

What I claim as new is—

A hard-rubber tire containing within itself air-cells connected by vents with a groove or second air-space, said second air-space being made impervious to the outside air by the tire being cemented firmly to the rim of the wheel, as shown and described.

In testimony whereof I affix my signature in presence of two witnesses.

JAMES E. FURLONG.

Witnesses:
 CHARLES M. SALISBURY,
 ANDREW MCKENZIE.